(12) United States Patent
Friedman et al.

(10) Patent No.: US 7,373,801 B2
(45) Date of Patent: May 20, 2008

(54) VEHICLE ROLLOVER TEST FIXTURE

(75) Inventors: Donald Friedman, Santa Barbara, CA (US); Acen Jordan, Carmel, CA (US)

(73) Assignee: Safety Testing Institute, Inc., Goleta, CA (US)

( * ) Notice: Subject to any disclaimer, the term of this patent is extended or adjusted under 35 U.S.C. 154(b) by 229 days.

(21) Appl. No.: 11/380,862

(22) Filed: Apr. 28, 2006

(65) Prior Publication Data

US 2006/0278026 A1    Dec. 14, 2006

Related U.S. Application Data

(60) Provisional application No. 60/676,160, filed on Apr. 29, 2005.

(51) Int. Cl.
  *G01N 3/00*    (2006.01)
  *G01M 17/00*   (2006.01)
(52) U.S. Cl. .................. 73/12.06; 73/12.13; 73/865.3
(58) Field of Classification Search .............. 73/12.04, 73/12.06, 12.07, 12.13, 865.3
See application file for complete search history.

(56) References Cited

U.S. PATENT DOCUMENTS

| 6,256,601 | B1 * | 7/2001 | Wipasuramonton et al. ... 703/8 |
| 6,622,541 | B2 * | 9/2003 | Stein et al. ................. 73/12.04 |
| 6,651,482 | B1 * | 11/2003 | Moffatt et al. ............. 73/12.12 |
| 2004/0254707 | A1 * | 12/2004 | Lu et al. ........................ 701/70 |
| 2006/0207353 | A1 * | 9/2006 | McCoy ...................... 73/865.6 |

OTHER PUBLICATIONS

Batzer S. A., Hooker R. M. "Dynamic Roof Crush Intrusion in Inverted Drop Testing" 19th International Safety Conference on the Enhanced Safety Vehicles, Paper No. 05-0146-W, Washington, D. C. Jun. 6-9, 2005. Accessed online on Jan. 30, 2008 <http://www-nrd.nhtsa.dot.gov/pdf/nrd-01/esv/esv19/05-0146-W.pdf>.*
Federal Motor Vehicle Safety Standards; Roof Crush Resistance. 49 CFR Part 571. Accessed online on Jan. 30, 2008 <www.nhtsa.dot.gov/cars/rules/rulings/RoofCrushNotice/216NPRM-to-FR.html>.*
Friedman K., Gaston F., Bish J. Experimental comparison of inverted dummy and living human drop tests. 1999 Bioengineering Conference. Accessed online on Jan. 30, 2008 <http://asme.pinetec.com/bio 1999/data/pdfs/a0025025.pdf>.*

* cited by examiner

*Primary Examiner*—Edward Lefkowitz
*Assistant Examiner*—Punam Patel
(74) *Attorney, Agent, or Firm*—Felix L. Fischer

(57) ABSTRACT

A test fixture for rollover crash testing of a test vehicle onto a moving surface employs a cradle to support and rotate the test vehicle. A vertical support structure to positions and releasably holds the cradle. A moving sled having a contact surface is carried by a guide extending beneath the structure and the cradle fixture. The cradle is rotated and released from the structure responsive to a sensor for contact within a drop impact zone on the contact surface of the moving sled. Vertical motion of the cradle is then arrested to prevent further damage to the test vehicle or the test structure.

30 Claims, 10 Drawing Sheets

VEHICLE ROLLOVER TEST FIXTURE

REFERENCE TO RELATED APPLICATIONS

This application claims the priority of U.S. Provisional Patent Application Ser. No. 60/676,160 filed on Apr. 29, 2005 having the same title as the present application.

BACKGROUND

1. Field of Invention

This invention relates to an automotive vehicle test fixture. In particular, the invention relates specifically to a fixture to conduct dynamic, repeatable, controlled destructive rollover impact tests of both full scale vehicles and representations to evaluate strength characteristics of the vehicle roof and other vehicle components. The invention provides precise control of initial test parameters including drop height, contact roll rate, contact roll angle, pitch angle, yaw angle, roadway speed, post contact freefall height, vehicle moment of inertia, roadway surface conditions including friction and impact obstructions. In addition, the invention enables multiple tests to be conducted and evaluated on an isolated singular roll-by-roll basis.

2. Description of Prior Art

Rollovers have been and continue to be a significant cause of occupant fatalities and serious injuries. To date, the experiments to determine vehicle performance have been criticized as unrepeatable and, thus, inappropriate for vehicle or component design and testing and/or compliance type testing. Various other test fixtures been developed that addresses some of these issues, but requires a large infrastructure to run and does not fully control the vehicle during the test (reference: U.S. Pat. No. 6,651,482). Another device (reference U.S. Pat. No. 6,256,601) articulates about a pivot but does not provide a full rollover capability, nor does it provide a means to simulate a roll about the true roll axis of a vehicle. In addition, none of the other test methods allow for the direct measurement of the loads applied to the vehicle, which are important to evaluating and understanding the dynamics of a rollover event. This subject invention resolves these issues in a manner that will allow effective repeatable vehicle testing. Vehicle testing in the rollover regime is crucial to understanding interactions between the occupant and the vehicle's structures, restraints, glazing, etc. A better knowledge of these parameters will allow for improved vehicle designs and a safer vehicle fleet.

Previous testing to determine vehicle performance and vehicle to occupant interactions in rollover conditions uses various types of tests including dropping a rotating vehicle, launching a vehicle from a dolly, launching a vehicle from a ramp or otherwise tripping a vehicle to initiate a roll. The major drawback of these tests is the unrepeatable nature of the testing. While these tests will allow insight into vehicle performance, they do not allow a study of vehicle and component performance during an impact that can be exactly repeated to determine changes in vehicle structure or geometry through repeated tests. In particular, earlier test methods do not result in consistent impacts due to variations in tire to dolly or tire to road impacts before the roof structure interaction or are not controlled after the roof impacts. By controlling the vehicle both before and after the roof impacts, performance during an impact can be isolated and examined in detail.

U.S. Pat. No. 6,651,482 describes an alternate method of rollover testing. The method described in that patent is considerably different from the invention discussed herein. These differences lead to several shortcomings in the previous methodology including the inability to measure the direct forces on the roof of the vehicle, the inability to control the vehicle after the desired roof contacts, the artificial positioning of anthropomorphic crash test dummies if included, the inability of the system to directly determine the roof crush from the desired impact, the inability to evaluate damage on a per roll basis.

U.S. Pat. No. 6,256,601 describes a rollover test sled designed to simulate the behavior of vehicle occupant and safety systems in a rollover accident. The method described differs significantly from the invention presented herein since the test does not provide the means to rotate a test vehicle or dummies about a roll axis. The fixture described also does not provide the means to rotate the test vehicle for the purposes to measure and evaluate vehicle structural integrity.

This invention addresses these issues and provides an improved dynamic, repeatable vehicle rollover test fixture.

SUMMARY OF THE INVENTION

A test fixture for rollover crash testing of a test vehicle onto a moving surface incorporates a cradle to support and rotate a test vehicle. The cradle is carried by a structure to position and releasably hold the cradle. A moving sled having a contact surface simulating a roadway is carried by a guide extending beneath the structure and the cradle fixture. The cradle and supported vehicle is released from the structure responsive to a sensor for contact within a drop impact zone on the contact surface of the moving sled. The cradle is rotated to coordinate the test vehicle and roadway position at impact and the vertical motion of the cradle is arrested at the event completion to avoid damage to the track and sled system as well as limiting further damage to the test vehicle.

BRIEF DESCRIPTION OF THE DRAWINGS

The elements and features of the invention are further described with respect to the detailed description herein and the following drawings wherein

FIG. 1b is a side view of the rollover fixture of FIG. 1a;

FIG. 8 diagrams an embodiment of a data acquisition system used to monitor and record dynamic physical responses of the vehicle, roadway and dummies within the

DETAILED DESCRIPTION OF THE INVENTION

Figure 1A:
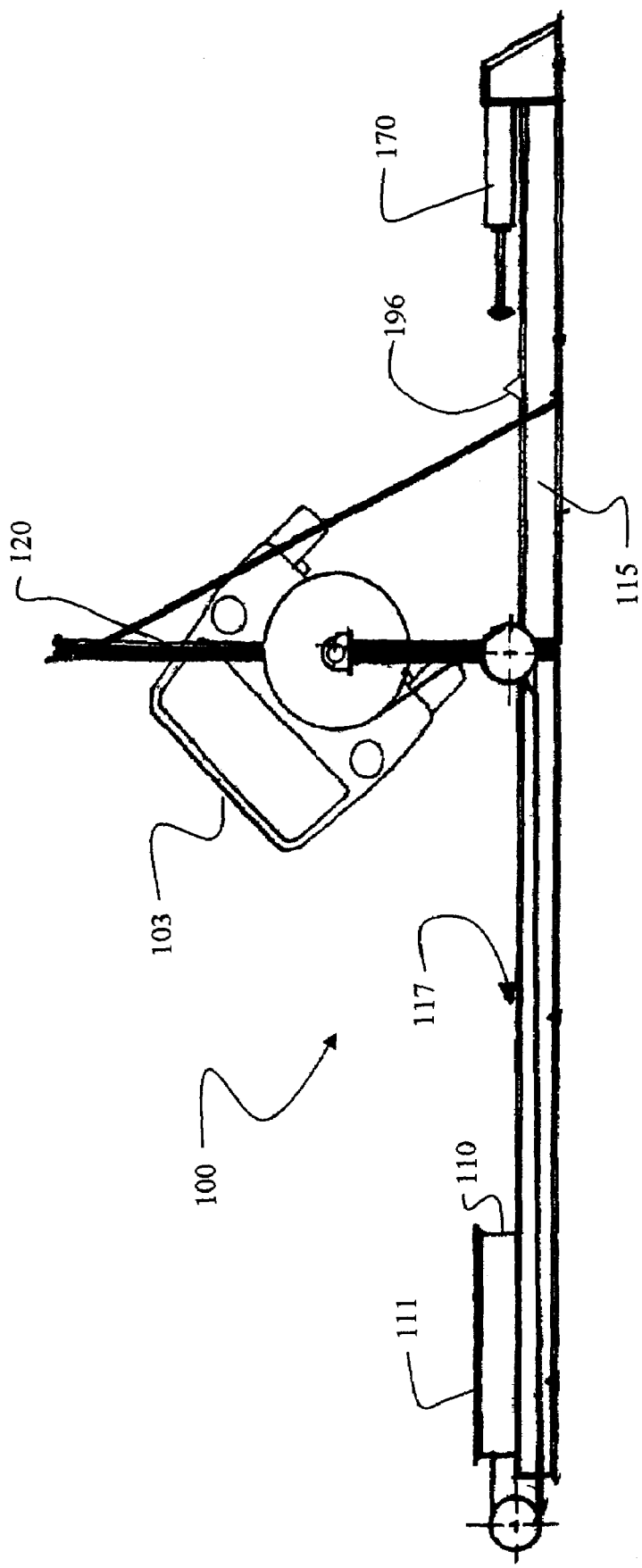
FIG. 1a is a front view of the rollover fixture showing the major components.

An exemplary embodiment of the present invention is illustrated in FIGS. 1a through 7. As best seen in FIGS. 1a, 1b and 2a, the test fixture 100 incorporates a sled 110 supported by sled guide rails 115. The sled 110 is translated toward and between drop towers 120 by means of propulsion cables 154 coupled to propulsion pistons 152 contained within propulsion cylinders 151. For the embodiment shown in the drawings, a roadway surface 111 is mounted to the upward face of the sled in order to simulate a road condition for impact with the vehicle. Various road surface materials are employed to simulate various real road conditions including Macadam and concrete. In alternative embodiments, various other surface features are mounted to the sled structure for impact studies.

Figure 2A:
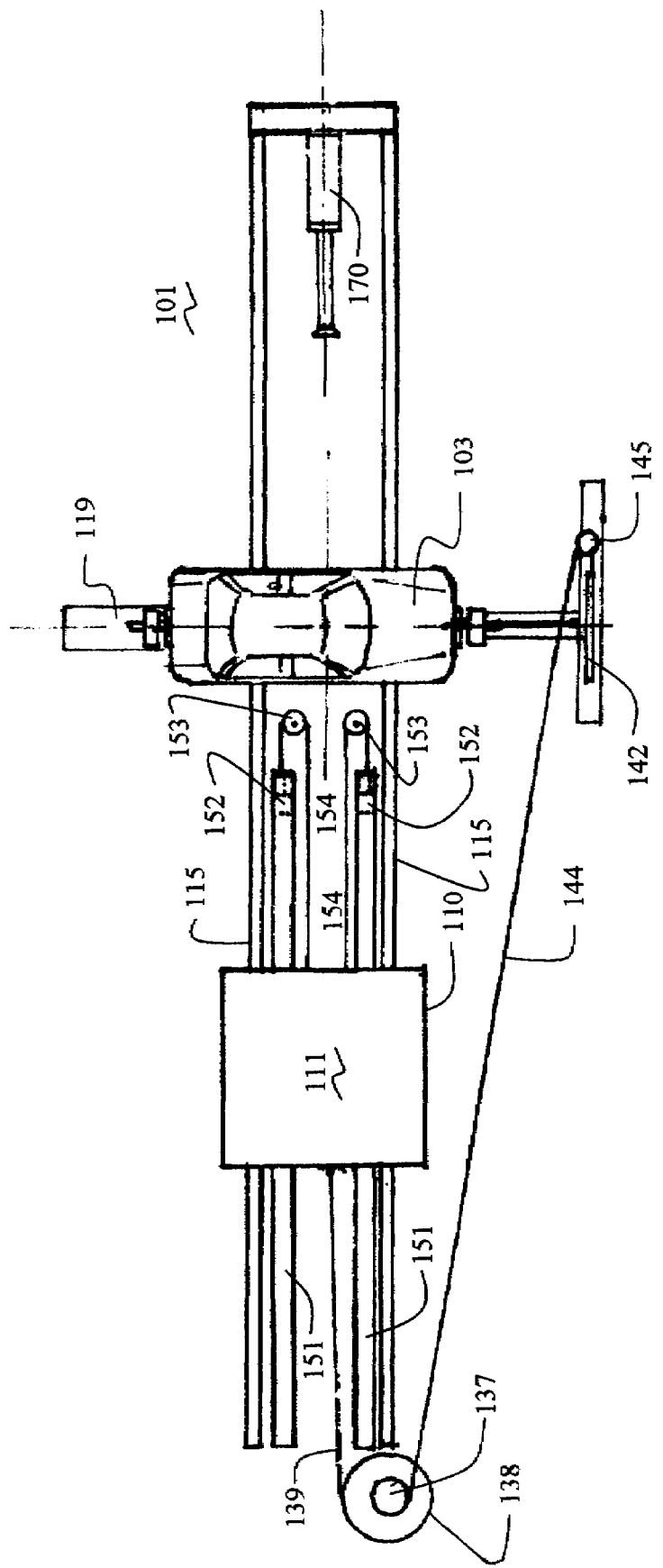
FIG. 2a is a plan view of the rollover fixture.
Figure 2B:
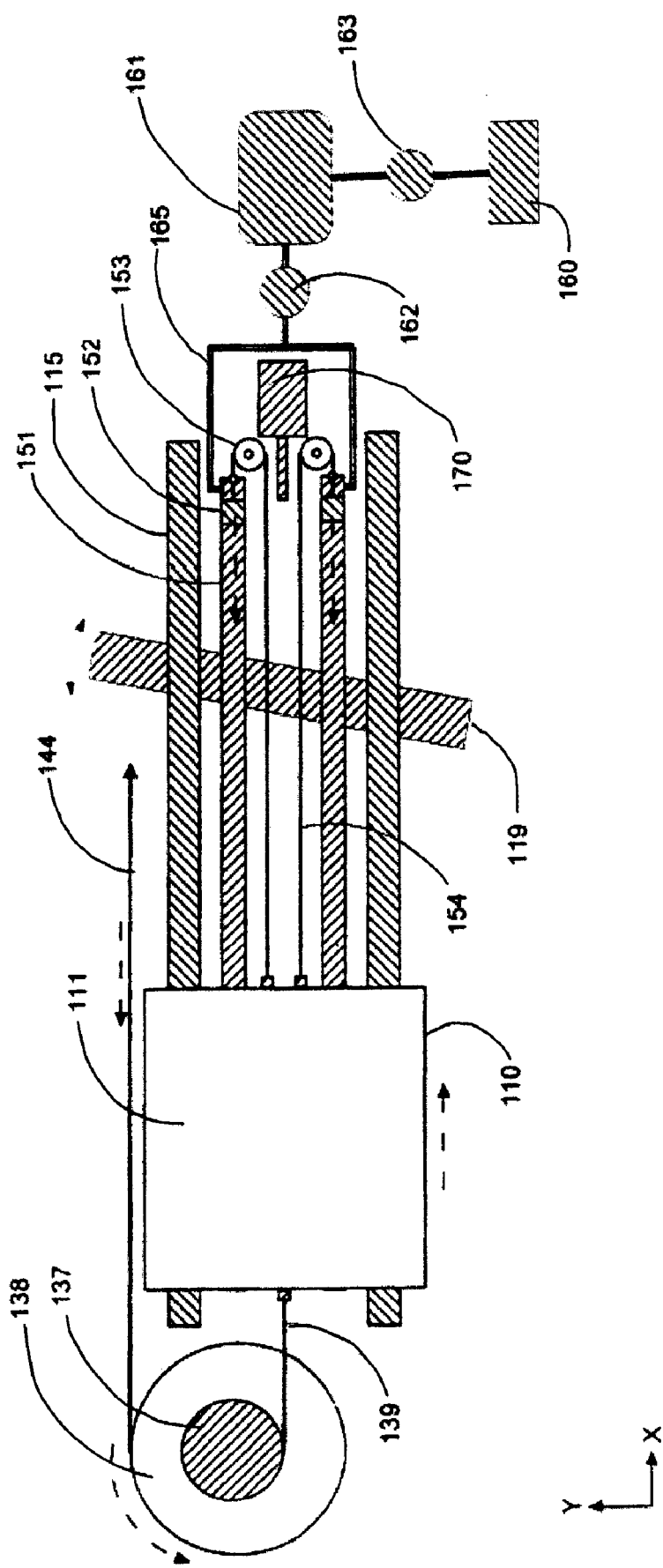
FIG. 2b is a plan view of elements of the rollover fixture with the drop tower assembly removed for clarity.
Figure 3:
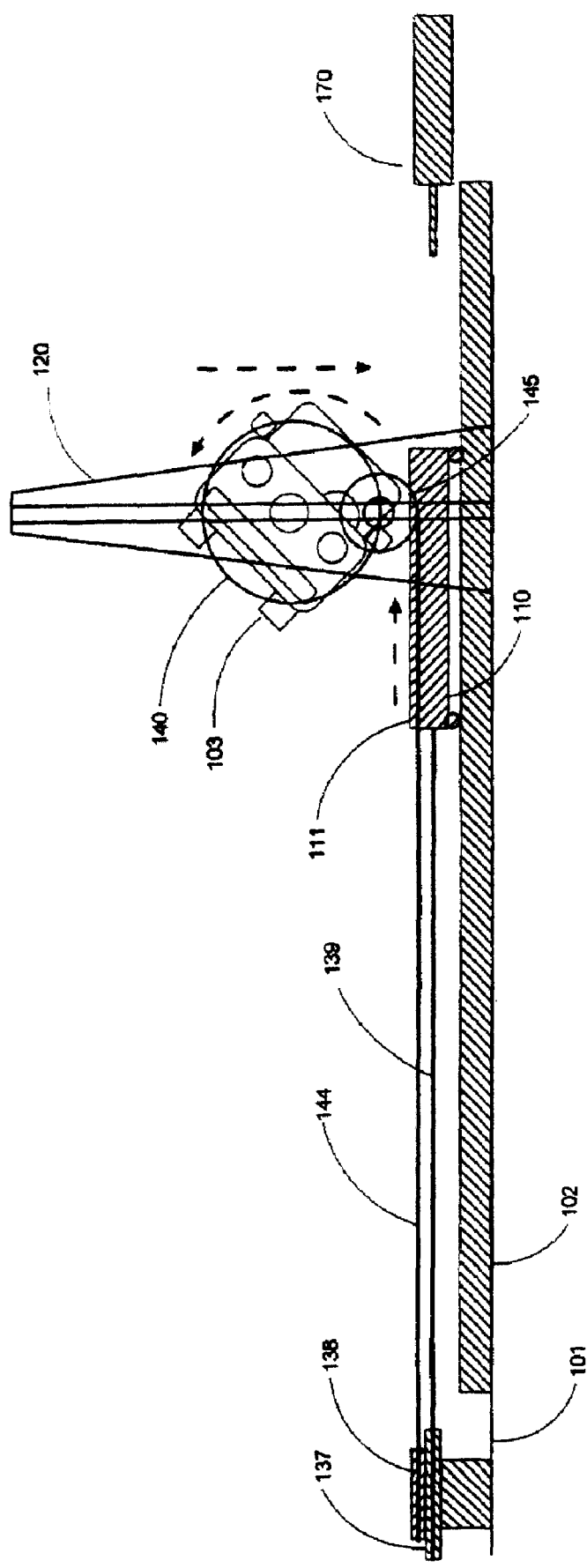
FIG. 3 is a front profile view of the rollover fixture illustrating a vehicle drop in process.
Figure 4:
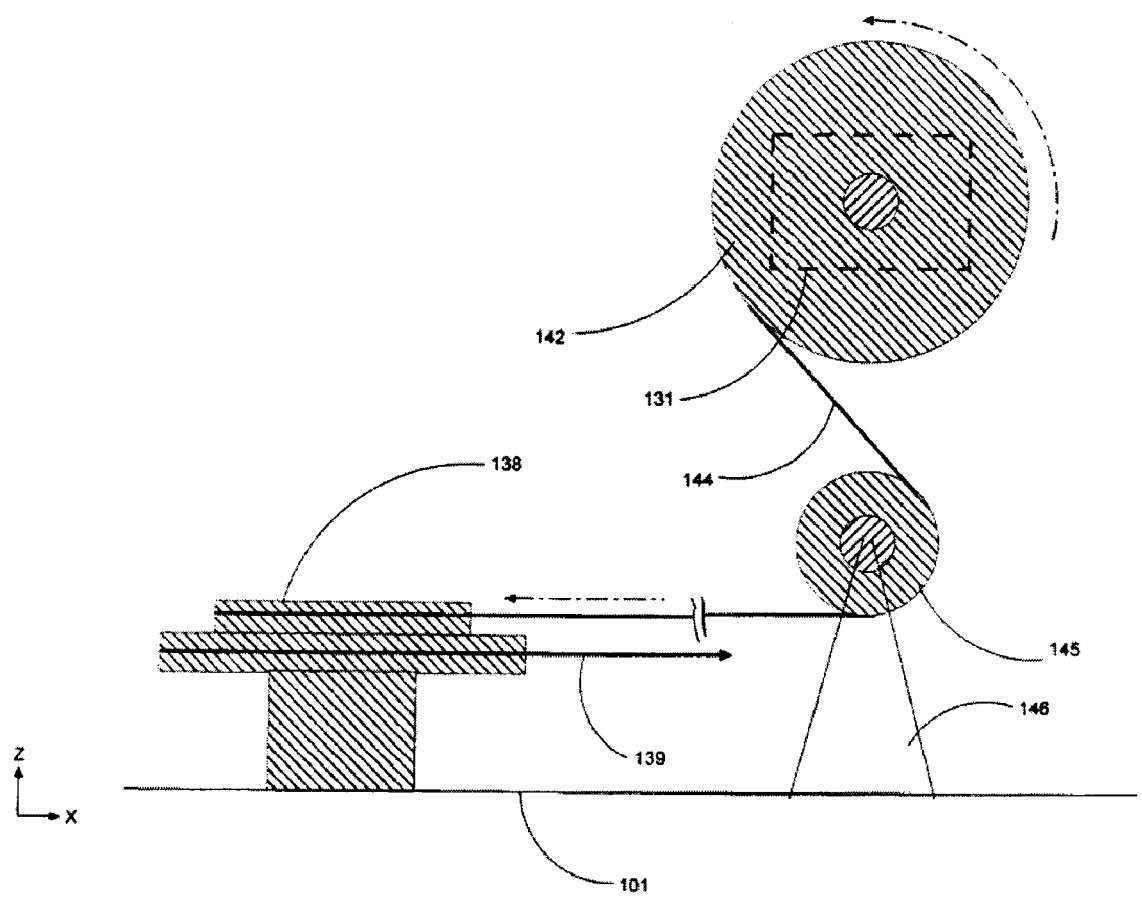
FIG. 4 illustrates an embodiment of a mechanism to drive the vehicle cradle utilizing a rotation drive cable with a corresponding set of pulleys.
Figure 5:
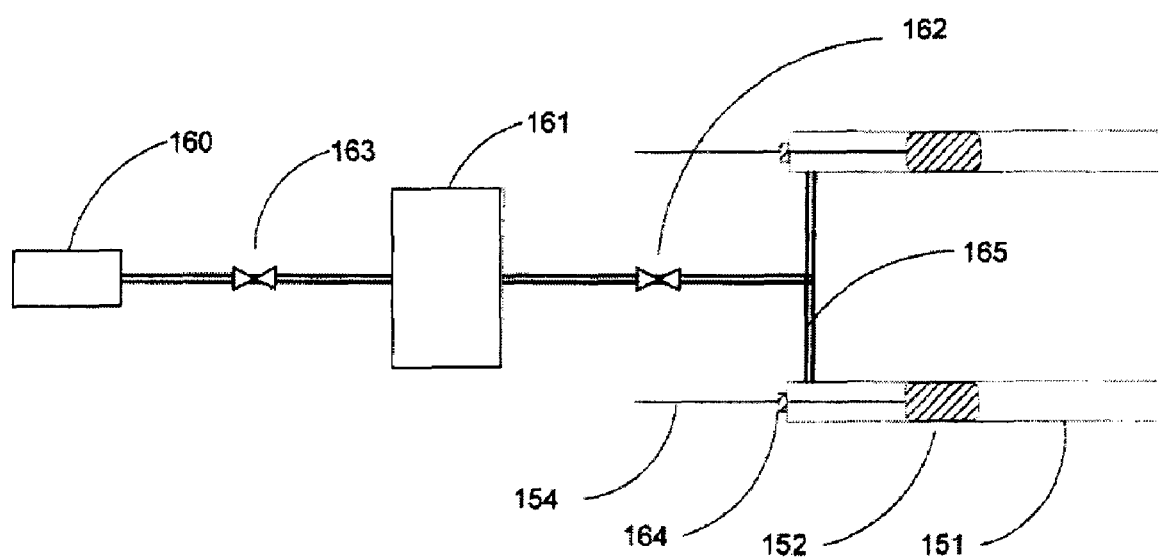
FIG. 5 diagrams an embodiment of a pneumatic propulsion system used to supply compressed air to the propulsion cylinders.

The drop towers assembly 120 includes a front drop tower 122 and a rear drop tower 123 connected overhead by a tower connection beam 121. The drop tower assembly 120 straddles the sled guide rails 115 and the towers are mounted to the yaw adjustment guide plates 119 that are pivotably fastened to the floor 101, as best seen in FIG. 2b. The angular orientation of the drop tower assembly relative to the sled guide rails 115 therefore sets the yaw position of the test vehicle. The drop towers 122 and 123 each support vertical guide bearings 130. Runner assemblies 105 which support and couple to a vehicle cradle 131 ride on the guide bearings for vertical motion of the cradle. The vehicle cradle 131 is fitted with various brackets to facilitate mounting of various models of full size test vehicles 103 or test bucks. Cradle ballast weights 136 may be also affixed to the vehicle cradle 131 in order to compensate or adjust the vehicle moments of inertia.

With the moving sled simulating the roadway for impact of the vehicle, rotation of the vehicle cradle synchronizes the impact of the vertically descending vehicle with the horizontally moving roadway. A rotation drive assembly 140 located adjacent the front drop tower 120 provides a rotation drive pulley support frame that supports a rotation drive pulley 142. A rotation drive support shaft 143 couples the rotation drive pulley 142 and the vehicle cradle 131. The drive support shaft 143 incorporates universal joints 106 that provide angular alignment between the drive pulley 142 and the vehicle cradle 131. Slide rods 109 couple the vehicle cradle to the runner assemblies.

Figure 6:
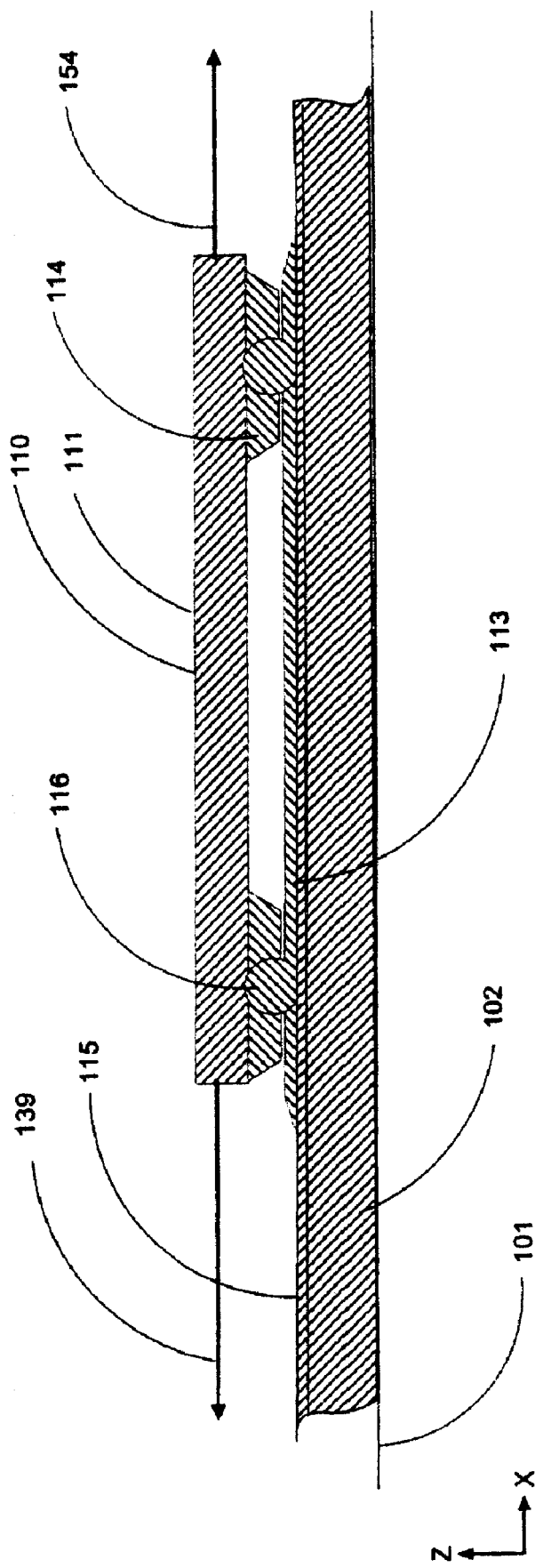
FIG. 6 is a front profile view of the sled positioned over the guide rail impact bearing plate.

For the embodiment shown in the drawings, motion of the sled is provided by a propulsion assembly 150, best seen in FIG. 6, incorporating pneumatic propulsion cylinders 151 that support and guide the linear motion of propulsion pistons 152. The cylinders are single acting design being closed at the pressure inlet end and open at the venting end. The first ends of the propulsion cables 154 are respectively coupled to the pistons 152 and extend through propulsion cable seals 164 at the closed end. The second ends of the cables 154 are respectively guided around propulsion pulleys 153, best seen in FIG. 2 and coupled to the leading edge of the sled 110.

The first end of coupling cable 139 attaches to the trailing side of the sled 110 with the second end spooled about the coupling pulley 138. The coupling pulley 138 is mounted and affixed onto a synchronization pulley 137 that rotates about a bearing shaft. A first end of a rotation drive cable 144 is spooled about the synchronization pulley 137 while the second end of the rotation drive cable 144 is spooled about the rotation drive pulley 142 as guided by a rotation idle pulley 145.

A sled decelerator 170 located at the end of the sled guide rails 115 is provided to beneficially decelerate and stop the sled in a controlled manner at the end of its travel. A drop trigger switch 117 located between the sled guide rails 115 and ahead of the drop towers 120 is provided to detect the leading edge of the sled 130 as it translates forward. Upon actuation of the trigger switch, the front drop actuator 126 and the rear drop actuator 127 are enabled thereby releasing the runners supporting the vehicle cradle 131 for motion down the vertical guide bearings 130 to synchronously drop with respect to the position of the sled 110.

Figure 1B:
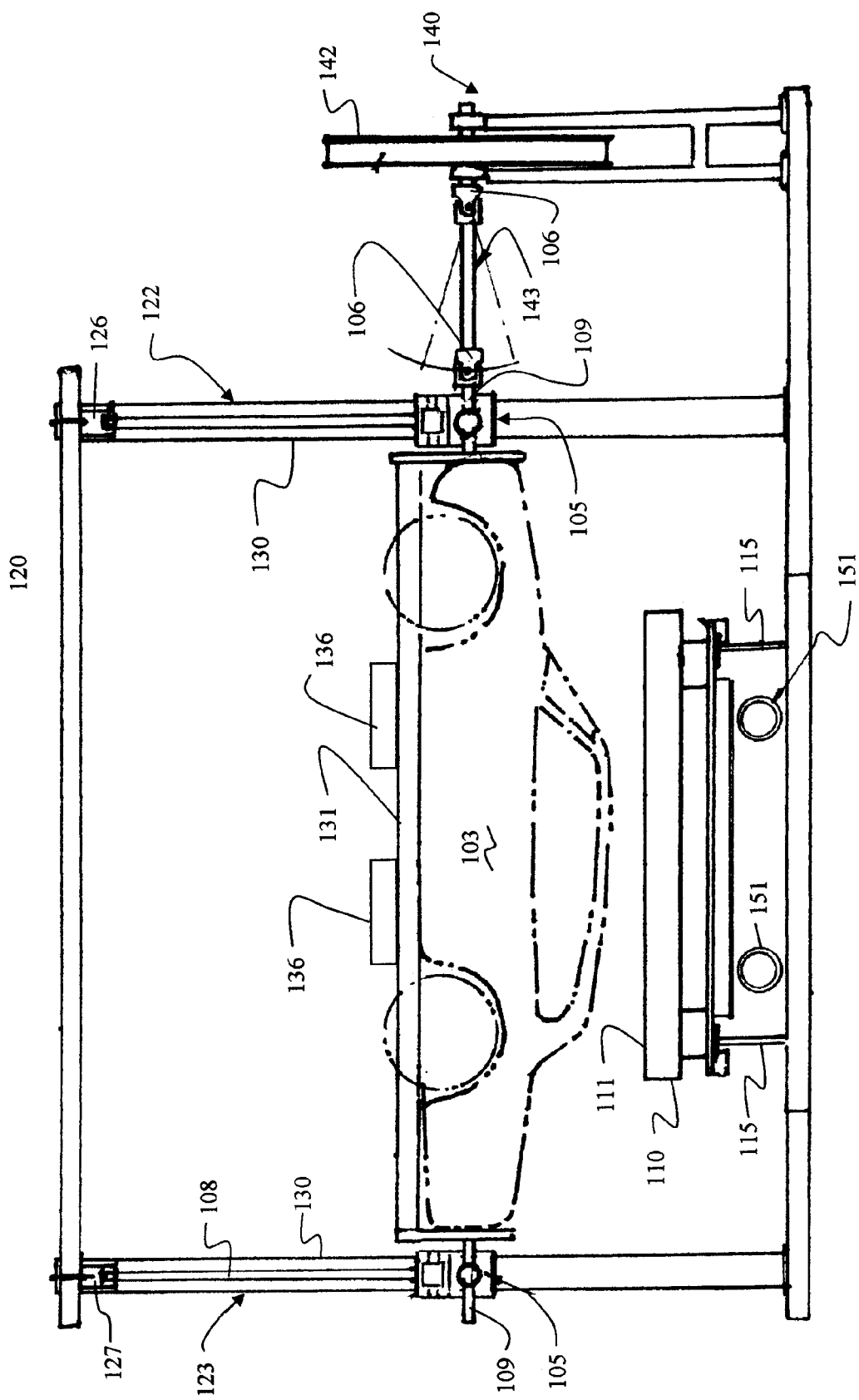

At the completion of the roll-over impact event, the car body or buck must be arrested to prevent damage to the support elements of the fixture or the sled or drive system through unwanted contact after the roadway portion on the sled has passed. To accommodate this requirement, a vertical brake assembly 107, best seen in FIG. 1b, is provided as a portion of the vertical runner assembly. The vertical brake engages a rail element 108 on the drop towers on each side of fixture. For the embodiment shown in the drawings the vertical brake is a disc brake assembly acting on the rail. The brake is actuated by a sensing element. In exemplary embodiments, an additional contact switch 196 on the road rail senses passage of the road bed and actuates the brake. Alternatively, event completion is determined by the angle of rotation of the vehicle under test or predetermined timing and sensing of the completed event is accomplished based on the rotation angle of the support shaft elements in the vertical runner assemblies. An index pin on the slide rod which engages a micro switch upon rotation through a predetermined arc or an angular rotation sensor on the axle or the rotation drive pulley is employed as the event completion sensor.

FIG. 6 shows additional elements of the sled and rail system for an exemplary embodiment. Low friction rail impact bearing plates 113 are attached to sled guide rails 115 within the drop impact zone. The moving sled with roadway rides on led guide rollers 116 and has attached to its underside a plurality of sled impact bearing blocks 114 for to transfer and distribute impact loads from the roadway surface to the rail impact bearing plates during impact of the test vehicle onto the roadway.

Figure 7:
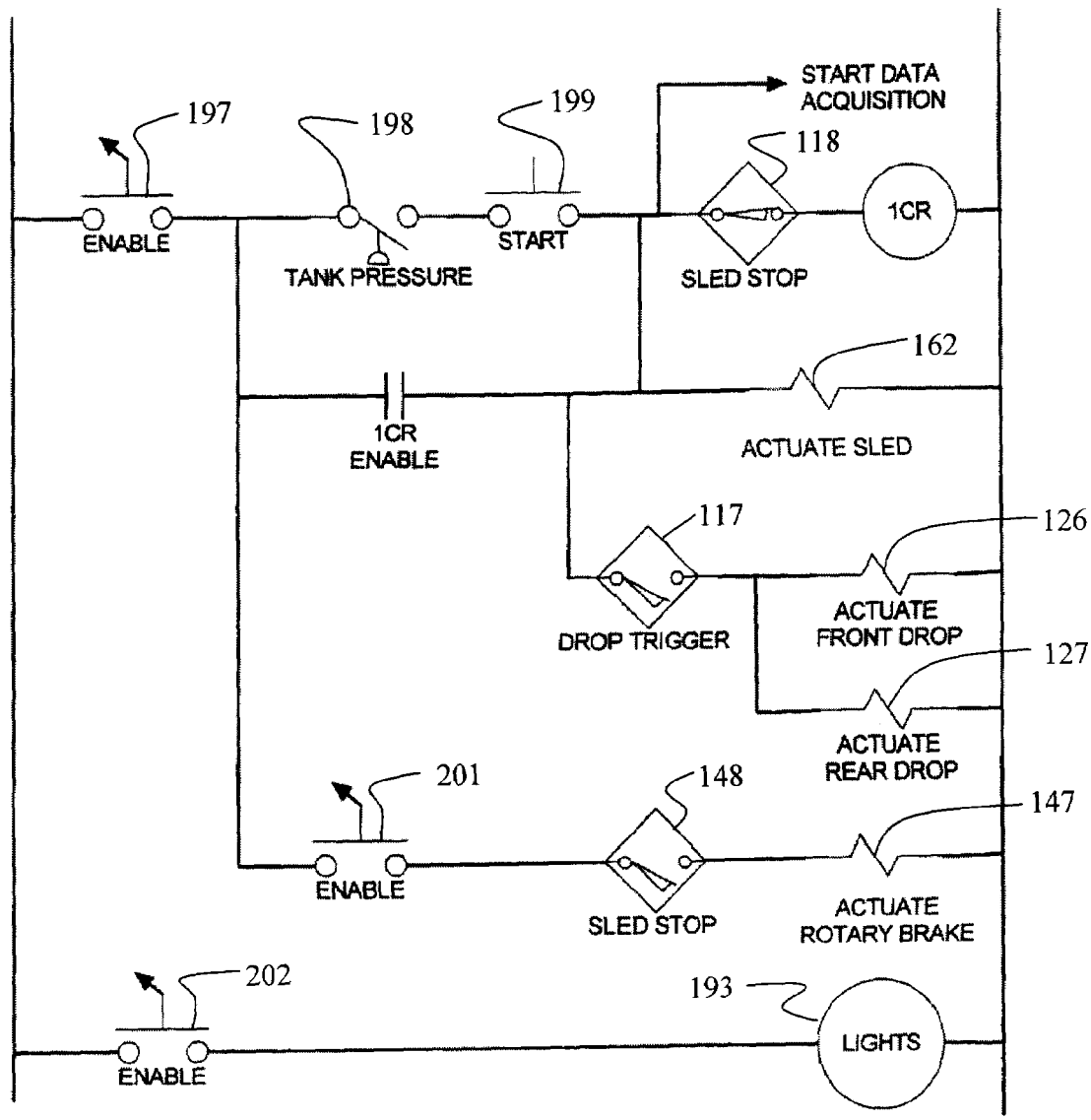
FIG. 7 diagrams an embodiment of an electrical control system used to manually start the rollover test process and to enable actuation of vehicle drop.

FIG. 7 is a diagram of a simplified electrical control system. Since human safety is paramount concern while conducting vehicle testing, system power is enabled by a key-switch. Compressed air tank pressure is monitored by a pressure switch to prevent starting a test unless requisite propulsion pressure is available in the compressed air tank 161. A start switch is manually actuated to initiate the test sequence that causes control relay 1CR to close and thereby energizing the actuate sled solenoid valve 162 while the sled stop switch 118 is closed. Upon energizing the actuate sled solenoid valve 162, compressed air from the compressed air tank 161 is released to the propulsion cylinders 151 causing the sled 110 to translate forward. As the sled 110 passes the drop trigger switch 117, the front drop actuator 126 and rear drop actuator 127 are energized to release thereby allowing the vehicle cradle 131 and the subject test vehicle 103 it contains to drop. An "enable rotation brake" key-switch is provided to enable optional activation of the rotation brake 147 upon closure of the rotation brake trigger switch 148.

As shown in FIG. 7, additional test equipment features such as illumination lights 193 for cameras 181 are controlled by a switch located the operator controls 180.

Figure 8:
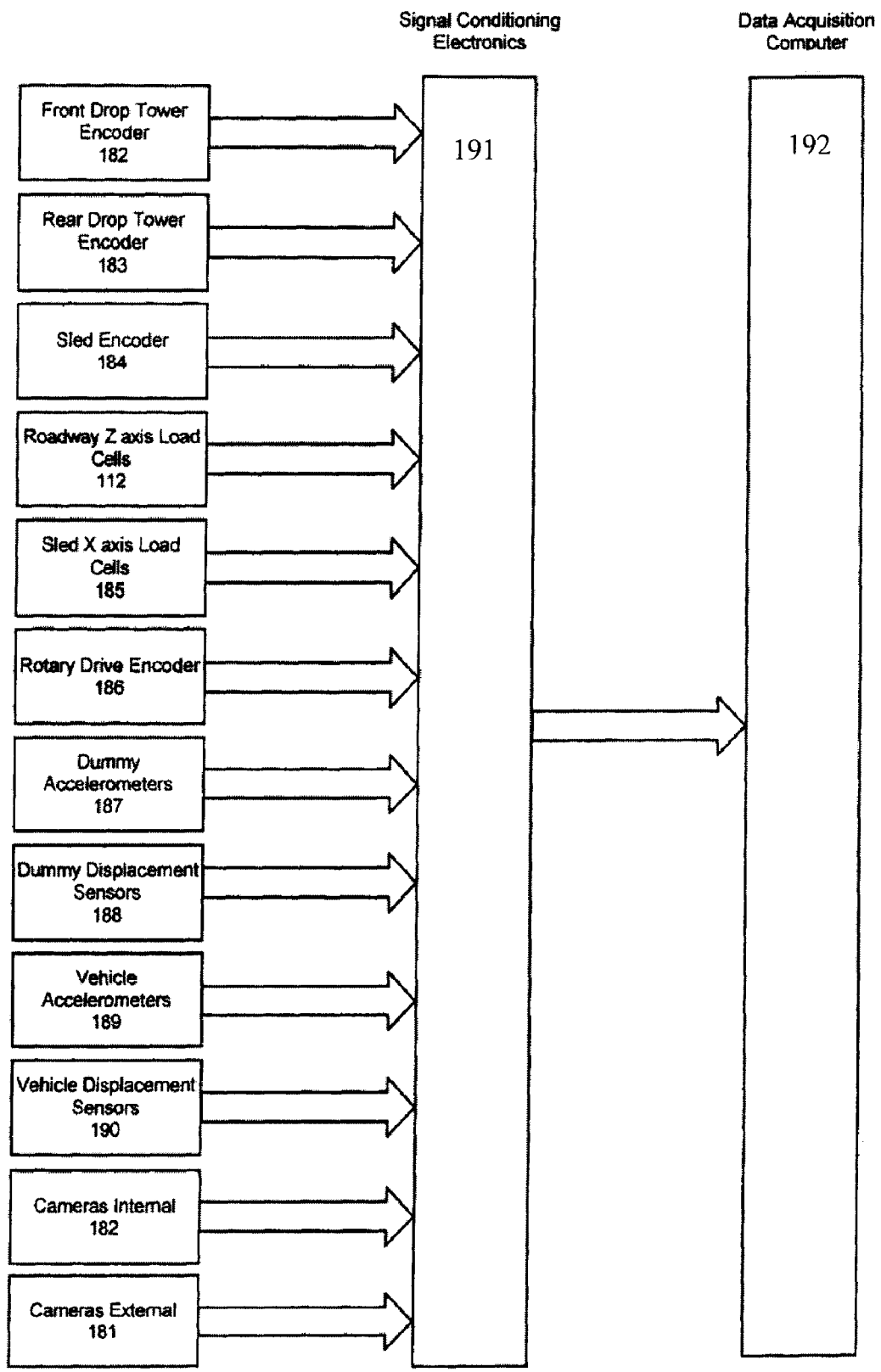

As shown in FIG. 8, a suite of instrumentation sensors is incorporated to measure and record the dynamic physical responses of the vehicle during the test. Sensors included in a preferred embodiment of the invention include: encoders 182 and 183 respectively mounted to the front and rear drop towers 122 and 123; encoder 184 is used to monitor the X axis linear position to derive speed and acceleration of the sled 110; load cells 112 arranged between the roadway surface 111 and the sled 110 to monitor Z-axis impact forces imposed by the test vehicle 103; load cells 185 arranged between the roadway surface 110 and the sled 110 to monitor X-axis impact forces imposed by the test vehicle 103; encoder 186 to monitor the roll orientation of the test vehicle 103; accelerometers 187 to monitor impact forces imposed upon a test dummy 104; sensors 188 to monitor displacements imposed upon a test dummy 104 during the test; accelerometers 189 to monitor impact forces imposed upon the test vehicle 103; sensors 190 to measure displacements imposed upon the test vehicle 103; cameras 181 mounted about the rollover apparatus 100 to monitor various external aspects of the test vehicle 103; cameras 182 mounted within the test vehicle 103 to monitor various internal aspects including roof crush intrusion and dummy positions during the test.

As shown in FIG. 8, the suite of sensors as previously described are preferentially input to signal conditioning electronics 192 and digitized for input to a data acquisition computer 193. Once digitized, the collected data is saved, analyzed and formatted for various studies and reports.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A test fixture for rollover crash testing of a test vehicle onto a moving surface said fixture comprising:
   a cradle to support and rotate a test vehicle;
   a structure to position and releasably hold the cradle;
   a moving sled having a contact surface and carried by a guide extending beneath the structure and the cradle;
   means for releasing the cradle and test vehicle from the structure responsive to a sensing means for contact within a drop impact zone on the contact surface of the moving sled;
   means for rotating the cradle; and
   means for arresting vertical motion of the cradle.

2. The apparatus of claim 1 further comprising means for detecting an event completion, the arresting means responsive to the detecting means, the test vehicle mounted in the cradle being isolated from additional impacts after a desired impact or impacts as the moving sled proceeds beyond the drop impact zone after impact.

3. The apparatus of claim 1 wherein the motion of the sled and the rotational motion of the cradle are coupled by means of a cable and pulley system.

4. The apparatus of claim 1 wherein the motion of the sled and the rotational motion of the test vehicle are synchronized in time and position by means of a cable and pulley system.

5. The apparatus of claim 1 wherein the motive force for the moving sled and the rotation of the cradle is provided by a pneumatic propulsion system.

6. The apparatus of claim 1 further comprising means for selectively setting pitch angle, yaw angle, roll angle, roll rate, roadway speed, drop height and position of impact on the roadway.

7. The apparatus of claim 1 further comprising ballast weights attachable to the cradle to set a weight of the test vehicle.

8. The apparatus of claim 1 further comprising ballast weights attachable to the cradle to set a roll moment of inertia of the test vehicle.

9. The apparatus of claim 1 wherein the moving sled is equipped with instrumentation to measure forces and accelerations imposed on the contact surface caused by impact from the dropping of the test vehicle.

10. The apparatus of claim 1 wherein the vehicle is equipped with various types of instrumentation that may include anthropomorphic dummies.

11. The apparatus of claim 1 wherein the fixture and including the test vehicle is monitored by a number of cameras mounted on or about the apparatus or the test vehicle.

12. The apparatus of claim 1 wherein low friction rail impact bearing plates are attached to the sled guide rails within the drop impact zone.

13. The apparatus of claim 1 wherein the moving roadway has attached to its underside a plurality of sled impact bearing blocks for the purpose to transfer and distribute impact loads from the roadway surface to the rail impact bearing plates.

14. The apparatus of claim 1 wherein various types of materials may be attached to the contact surface to effect and simulate different roadway friction conditions.

15. The apparatus of claim 1 wherein various types of materials may be attached to the contact surface to effect and simulate different roadway obstacles and conditions.

16. The apparatus of claim 1 wherein a pulley is used to rotate the test vehicle by means of a set of coupling joints to allow angular and translational compliance between the drive pulley and the test vehicle cradle.

17. A method for crash testing of a test vehicle or representation thereof onto a moving surface comprising the steps of:
   providing a structure to support and position a test vehicle component above a moving sled path;
   providing a moving sled on the path onto which the test vehicle is dropped in synchronous coordination with simulated roadway obstacles within an impact zone;
   rotating the support structure to position the test vehicle for impact onto the impact zone on the moving sled;
   triggering the drop of the test vehicle at a specific time with respect to the position of the moving sled; and,
   isolating the test vehicle from additional impacts after the desired impact or impacts as the moving roadway proceeds beyond the impact zone after impact.

18. The method of claim 17 wherein the motion of the sled carrying the roadway surface is driven by means of a cable and pulley system.

19. The method of claim 17 wherein the motion of the sled carrying the roadway surface and the motion of the test vehicle are synchronized in time and position by means of a cable and pulley system.

20. The method of claim 17 wherein the motive force for the moving roadway surface and motion of the test vehicle is provided by a pneumatic propulsion system.

21. The method of claim 17 further comprising the step of selectively setting positional parameters of the test vehicle including pitch angle, yaw angle, roll angle, roll rate, roadway speed, drop height and position of impact on the contact surface.

22. The method of claim 17 further comprising the step of setting strength to weight ratio of the test vehicle by means of adjusting ballast weights to the vehicle support cradle or test vehicle.

23. The method of claim 17 further comprising the step of setting moments of inertia of the test vehicle by means of adjusting ballast weights to the vehicle support cradle or to the test vehicle.

24. The method of claim 17 wherein the moving contact surface is equipped with instrumentation and further comprising the step of measuring forces and accelerations imposed on the contact surface caused by impact with the test vehicle.

25. The method of claim 17 wherein the vehicle is equipped with various types of instrumentation that may include anthropomorphic dummies.

26. The method of claim 17 further comprising the step of monitoring the fixture and including the test vehicle by a number of cameras mounted on or about the structure or the test vehicle.

27. The method of claim 17 wherein the sled path comprises sled guide rails and said step of providing a structure includes providing low friction rail impact bearing plates attached to the sled guide rails within the impact zone.

28. The method of claim 27 wherein the sled path comprises sled guide rails and said step of providing a moving sled includes attaching to the sled underside a plurality of sled impact bearing blocks for the purpose to transfer and distribute impact loads from the contact surface to the rail impact bearing plates.

29. The method of claim 17 wherein the step of providing a moving sled includes attaching various types materials to the contact surface to effect and simulate different roadway surface friction conditions.

30. The method of claim 17 wherein the step of providing a moving sled includes attaching various types of materials the contact surface to effect and simulate different roadway obstacles and conditions.

* * * * *